United States Patent [19]
Kazenski

[11] Patent Number: 5,655,320
[45] Date of Patent: Aug. 12, 1997

[54] ANIMAL TAG FASTENER

[76] Inventor: Walter R. Kazenski, 291 Ridgemont Dr., Darlington, Pa. 16115

[21] Appl. No.: 454,586

[22] Filed: May 30, 1995

[51] Int. Cl.$^6$ ..................................................... G09F 3/00
[52] U.S. Cl. ........................................................ 40/302
[58] Field of Search .............................. 40/300, 301, 302, 40/304; 119/655

[56] References Cited

U.S. PATENT DOCUMENTS

| | | | |
|---|---|---|---|
| D. 325,268 | 4/1992 | Wirrick et al. | D30/155 |
| 4,716,899 | 1/1988 | Hoenefeld et al. | 128/330 |
| 4,721,064 | 1/1988 | Denk et al. . | |
| 4,748,757 | 6/1988 | Howe | 40/301 |
| 4,878,456 | 11/1989 | Howe | 119/655 X |
| 5,152,249 | 10/1992 | Howe . | |
| 5,234,440 | 8/1993 | Cohn | 606/117 |

*Primary Examiner*—Robert P. Swiatek
*Attorney, Agent, or Firm*—John D. Guplierra; David L. Volk

[57] ABSTRACT

A pin portion includes a head and an elongated pin extending outwardly from the head. The pin includes at least one barb extending outwardly therefrom. A receiving portion includes an elongated, substantially tubular receiving socket having an open end opposite a distal end. The receiving portion further includes a flange connected to the receiving socket and extending substantially radially therefrom. The interior surface of the receiving socket includes an un-notched portion beginning proximate the open end and terminating between the flange and the distal end. The interior surface further includes at least one notch therein, the notch positioned between the un-notched portion and the distal end, and configured to receive the barb therein. A strap connects the pin portion to the receiving portion. A scored cut line is disposed on the exterior surface of the receiving socket proximate the flange.

2 Claims, 3 Drawing Sheets

ANIMAL TAG FASTENER

BACKGROUND OF THE INVENTION

1. Field of the Invention

The present invention relates generally to identification tags and identification tag holders, and, more particularly, to an attachment device specifically designed to attach tags to harvested game animals.

2. Description of the Related Art

In the related art, many identification tags and methods for attaching identification tags to animals are known. For instance, in U.S. Pat. No. 5,152,249 issued in the name of Howe, an attachment device for animal ear tag is disclosed. An ear tag made in accordance with the '249 Howe disclosure comprises essentially a flexible stud driven through the ear of an animal which holds a molded skirt. The molded skirt portion provides increased flexibility at a point away from the stud and base, thereby attempting to reduce the likelihood of damage to the animal's ear that could be caused by similar but nonflexible tag.

Also, in U.S. Pat. No. 4,748,757, also issued in the name of Howe, an animal identification tag is disclosed. In the '757 Howe reference, an animal identification tag is disclosed designed with improved flexibility between a shaft and a connected tab. The improved flexibility is generated by an area of concentric ridges in the circumferential region between the tag and the shaft and around the shaft.

Additionally, U.S. Pat. No. 4,721,064 issued in the name of Denk et al., an animal ear tag is disclosed. The animal ear tag described in Denk et al., is an assembly having at least one wide section, along the length of the body of the tag, thicker than the body of the tag. The wide section is affixed by a post and a connector. A washer is affixed to the post in order to allow the wide section to rotate. The tag also extruded from a plasticized PVC compound which includes an insecticide releasing composition.

Finally, in U.S. Design Pat. No. 325,268, issued in the name of Wittick et al., an ornamental design for an animal ear tag is disclosed. The ornamental design of the Wittick et al. disclosure appears to be a tag with a pin and a receptacle to attach to a subject by sandwiching the tagged item.

Other problems addressed in the art include manners in which to affix an ear tag device.

Several attempts appear in the art for just such a device. For example, in U.S. Pat. No. 5,234,440 an ear tag applicator is disclosed issued in the name of Cohr. This applicator tool for animal ear tags disclosed in the Cohr reference is essentially a trigger activated spring loaded tag gun that provides force to an ear tag which has a nail-like or pin-like penetrating point.

Finally, in U.S. Pat. No. 4,716,899 issued in the name of Huenefeld et al., a device for attaching an identification tag to an ear or the like of an animal is disclosed. The tool disclosed in Huenefeld et al., is, in essence, similar in application to the Cohr tool in that it is essentially a lever-operated clamp that aids in puncturing an item requiring a tag.

Consequently, a need has been felt for providing an improved game tag fastener which attaches a tag to a harvested animal or bird in a direct, secure, and easy manner.

SUMMARY OF THE INVENTION

It is therefore an object of the present invention to provide an improved game tag fastener that can be used to attach the required game tag to an ear, antler, or leg of harvested game animals or birds.

It is a further object of the present invention to provide an improved game tag fastener that provides less chance of losing the tag after it becomes attached to the game animal.

It is a further object of the present invention to provide an improved game tag fastener that results in minimum damage to an animal that is being mounted.

It is yet a further object of the present invention to provide an improved game tag fastener that will work on all game birds and animals. Finally, it is yet another object of the present invention to provide an improved game tag fastener that provides reliable attachment for an identification tag, minimizing accidental removals and losses of tag, but can be easily intentionally removed by the user.

It is a feature of the present invention to provide an improved game tag fastener which has both an external elongated pin matched into a receiving receptacle in order to provide firm securement of a tag either through or around an animal or an animal's extremity.

Briefly described according to the preferred embodiment of the present invention, the game tag fastener is provided comprising of elongated plastic straps having two ends. Affixed to one end is a hard plastic pin having a series of external circumferential barbs. At the other end of the strap is attached a receptacle matched to the plastic pin and having internal receiving notches to accept or contain the external circumferential barbs of the plastic pin.

An advantage of the present invention is that it can be attached through the ear of a game animal.

Another advantage of the present invention is that it can be attached around the antler or leg of the harvested game animal.

Another advantage of the present invention is that it can be utilized for a game animal or a game bird.

Another advantage of the present invention is that it provides minimal damage to an animal that is being mounted for display.

Another advantage of the present invention is that it will securely affix a tag to any game bird or animal.

Further, a preferred environment of the present invention has a scored cut line having a receiving receptacle that will allow removal only upon shearing the tag fastener at the scored line.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
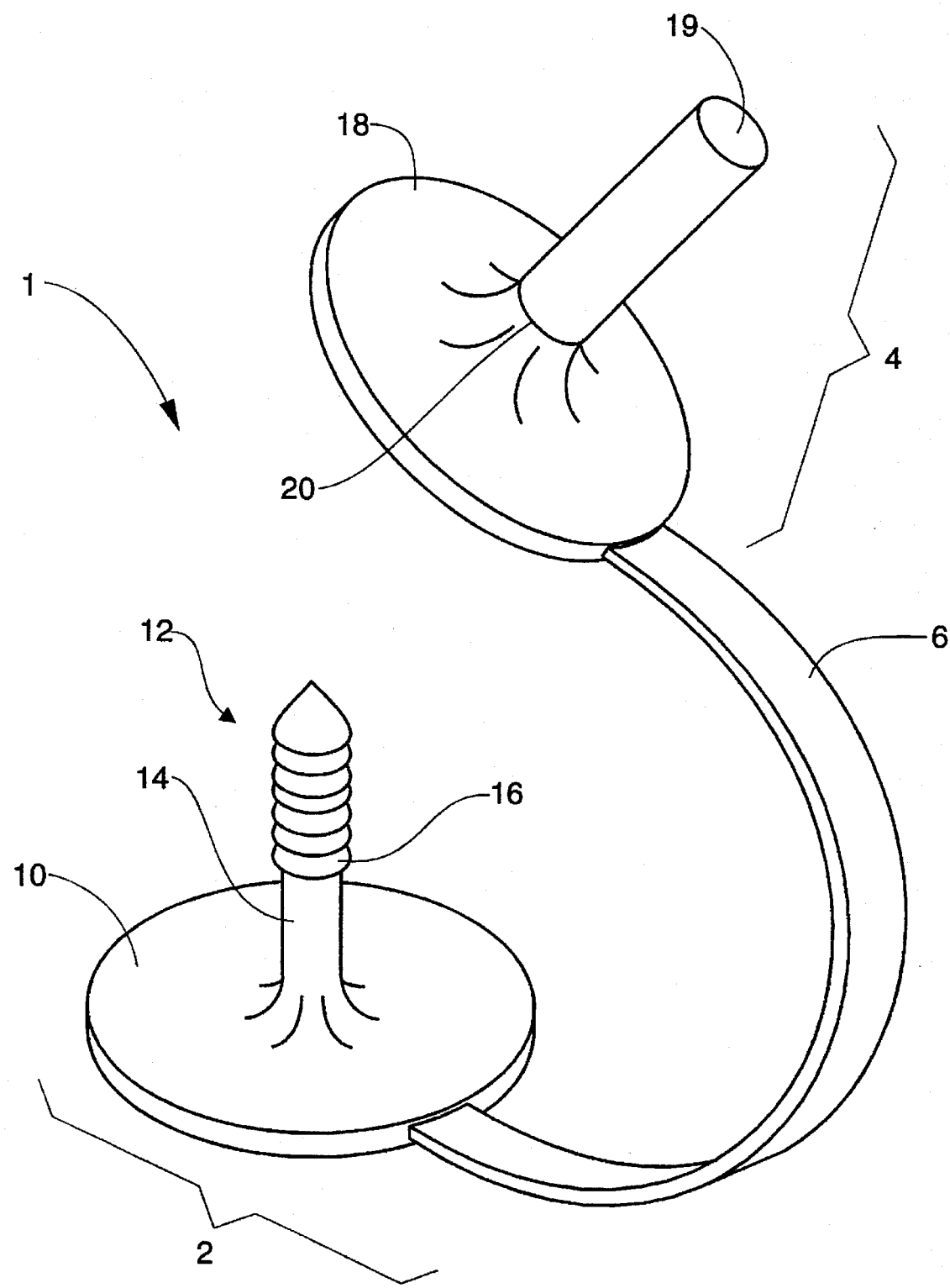
FIG. 1 is a perspective view of a game tag fastener according to the preferred embodiment of the present invention.

Referring now to FIG. 1, a game tag fastener, generally noted as 1, is shown, according to the present invention, having a hard, plastic pin end 2, a matching receptacle end 4, both connected by thin, flexible elongated strap 6. The hard plastic pin end 2, is comprised essentially of a flat, solid disc 10, and has a barbed, elongated pin 12 protruding centrally therefrom. The barbed, elongated pin 12, is comprised of a generally elongated shaft 14, circumscribed along its length with wedge-shaped barbs 16.

In accordance with a preferred embodiment of the present invention, it is currently envisioned that the wedge-shaped barbs 16 are vertically aligned and of similar size, shape, and placement. However, it is also envisioned that the wedge-shaped barbs 16, may be of a variable size and shape, or random placement. In the preferred embodiment of the present invention, the flat, solid disc 10 is at least 1" in diameter across, and the barbed, elongated pin 12 is at least 1" long and 3/16" in diameter, extending perpendicularly and centrally from the disc. According to the preferred embodiment of the present invention, the elongated strap 6 having a length of 4" long would provide adequate clearance for the tagging of the various extremities of most game birds and animals.

The receptacle end 4 is comprised of a round flange 18, having a similar size and shape as the flat disc 10, and a pin receiving socket 19. A scored cut line 20 is scribed along the outer circumference of the pin receiving socket 19. The scored cut line 20 is located at a point marking the optimum location for a user to cut through both the pin receiving socket 19 and the barbed, elongated pin 12 when the pin 12 is engaged in the socket 19 when in use in order to disengage the game tag fastener.

Figure 2:
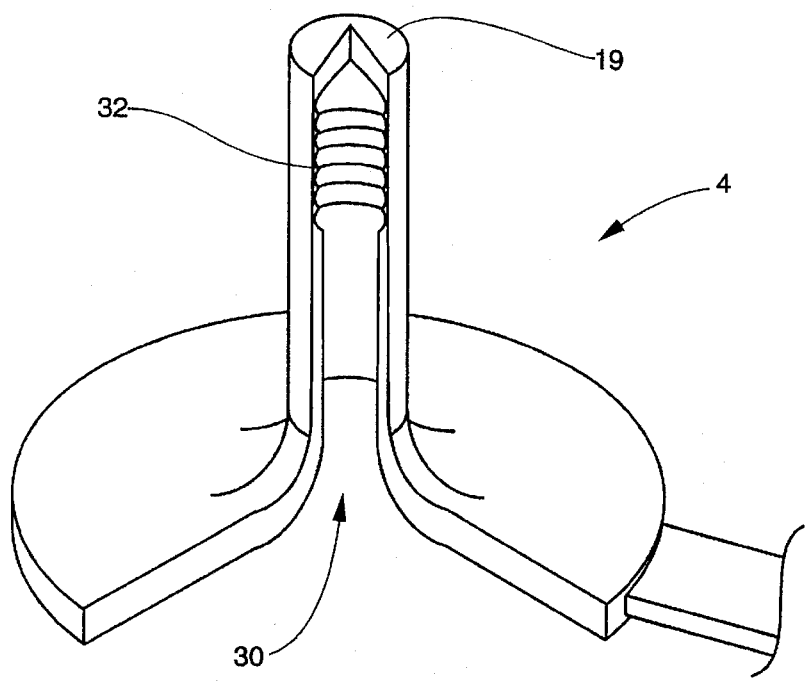
FIG. 2 is an exploded, cross-sectional perspective of the receptacle end of the game tag fastener as described in FIG. 1.

Referring now to FIG. 2, the internal configuration of the receiving receptacle end 4 is shown. Generally, the pin receiving socket 19 has an internal chamber 30 which accommodates engagement of the hard plastic pin end 2 as shown in FIG. 1. Aligning the internal circumference of the pin receiving socket 19 is a series of receiving notches 32 for receiving the wedge-shaped barbs 16 of the elongated pin 12. According to the preferred embodiment of the present invention, these receiving notches 32 are of a similar size and shape such as to match and fit the wedge shaped barbs 16 of the elongated pin 12.

Figure 3:
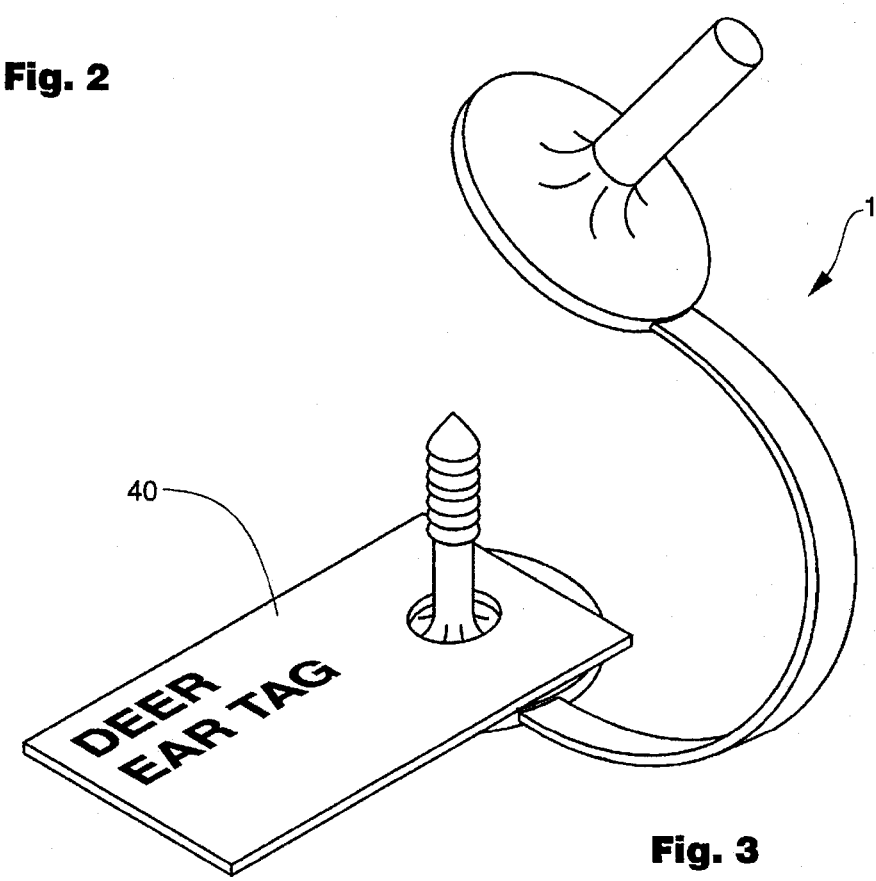
FIG. 3 is a perspective view of the game tag fastener as described in FIG. 1 in use with an identification tag.

FIG. 3 shows the game tag fastener 1, in use with an identification tag 40. It is currently envisioned that with the preferred embodiment for the present invention an identification tag 40 of a variety of sizes, shapes and materials can be utilized with the present invention. According to FIG. 3, an identification tag 40 is shown placed over the pin 12 and resting against the flat disc 10.

2. Operation of the Preferred Embodiment

Figure 4:
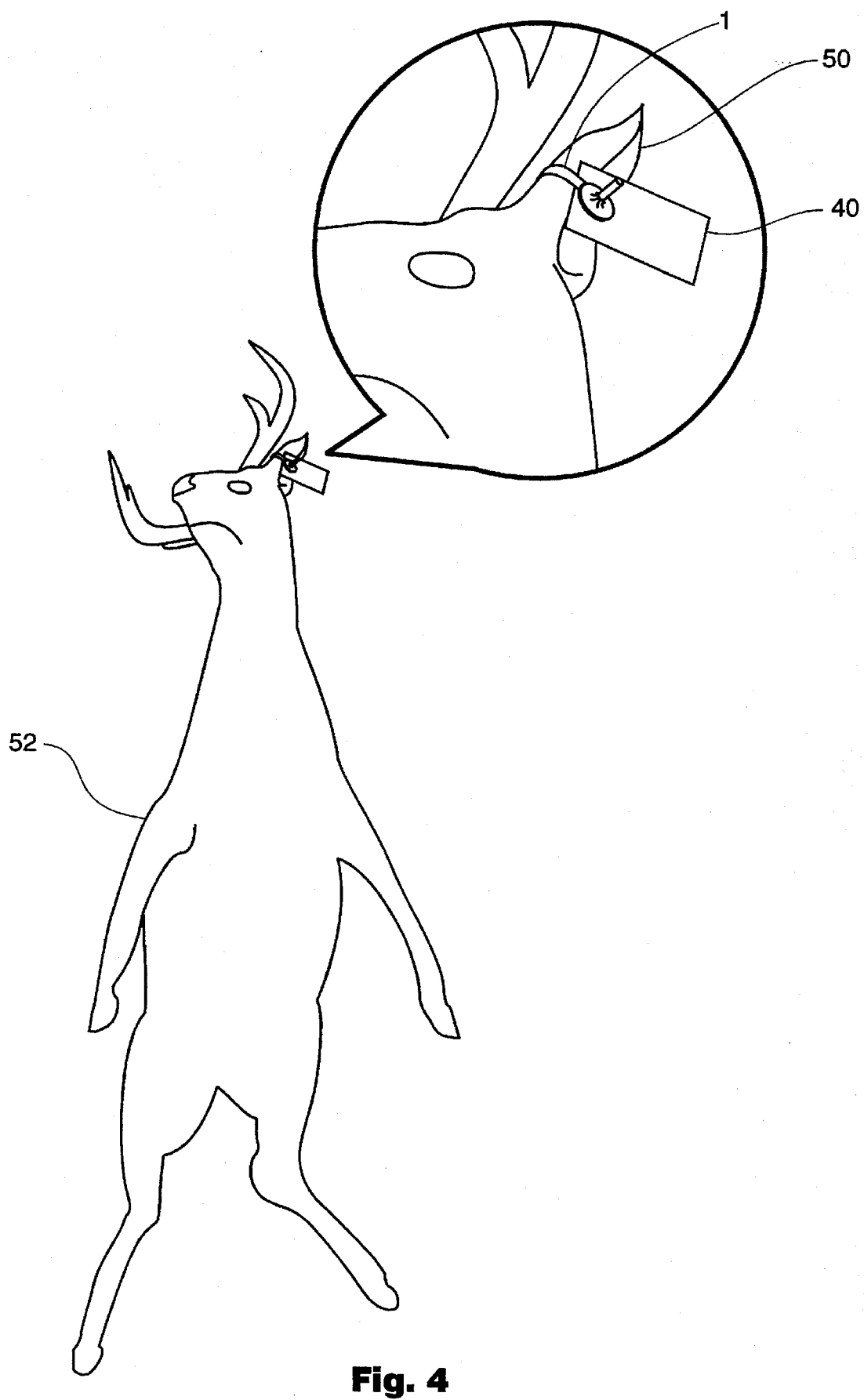
FIG. 4 is depicts the game tag fastener shown in FIG. 1 in use securing an identification tag to the ear of a game animal.

In operation, the present invention is shown in FIG. 4 where the game tag fastener 1, holding an identification tag 40 is wrapped and attached to the ear 50 of a game animal 52. To accomplish this procedure, the user places the identification tag 40 over the pin 12, and places the pin 12 against the ear 50 of the game animal 52. The user then pushes the pointed end of the pin 12 through the ear 50, and locks the fastener 1 in place by inserting the pin 12 fully into the receptacle 19. Although not depicted in the present figure, the user could easily have wrapped the elongated strap 6 on the antler of the game animal and affixed the pin 12 into the pin receiving socket 19 in a similar manner, thereby creating a loop holding strap secured around the antler of the game animal in such a manner that it would not slide off.

It is also currently envisioned according to the preferred embodiment of the present invention that a series of similar game tag fasteners could be linked in series to provide a fastener of a larger nominal diameter in order to accommodate the large extremities, such as the leg of an animal.

In order to remove the game tag fastener 1, the user simply cuts the connected fastener along the scored cut lined 20 with a knife or scissors. The matching receptacle end 4 is thereby separated from the pin end 2, which causes the disengagement of the fastener and easy removal of the tag.

While the preferred embodiment of the invention has been shown and described, it will be understood that it is not intended to limit this disclosure, but rather it is intended to cover all modifications and ultimate constructions following within the spirit and scope of the invention as defined in the following claims.

What is claimed is:

1. A game tag fastener comprising:
   a. a pin portion for holding an identification tag and for piercing game animals;
   b. the pin portion including a head and an elongated pin extending outwardly from the head, the pin including at least one barb extending outwardly from the pin;
   c. a receiving portion including an elongated, substantially tubular receiving socket having a length, an interior surface, an open end, and a closed distal end disposed opposite the open end;
   d. the receiving portion further including a flange connected to the receiving socket and extending substantially radially from the receiving socket;
   e. the interior surface having an un-notched portion beginning proximate the open end and terminating between the flange and the distal end;
   f. the interior surface having at least one notch therein, the at least one notch positioned between the un-notched portion and the distal end, and configured to receive the at least one barb therein, thereby securing the pin within the receiving socket; and
   g. the receiving socket including an exterior surface and a scored cut line positioned on the exterior surface proximate the flange and disposed opposite the un-notched portion of the interior surface.

2. The game tag fastener of claim 1, further including a strap connecting the pin portion to the receiving portion.

* * * * *